United States Patent

Frech et al.

[15] 3,666,829
[45] May 30, 1972

[54] DIMERIZATION OF PROPYLENE

[72] Inventors: Kenneth J. Frech, Tallmadge; James J. Garmon, Hudson, both of Ohio

[73] Assignee: The Goodyear Tire & Rubber Company, Akron, Ohio

[22] Filed: Oct. 29, 1969

[21] Appl. No.: 872,421

Related U.S. Application Data

[63] Continuation of Ser. No. 668,264, July 14, 1967, abandoned, which is a continuation-in-part of Ser. No. 539,243, Feb. 23, 1966, abandoned, which is a continuation-in-part of Ser. No. 312,560, Sept. 30, 1963, abandoned.

[52] U.S. Cl............................260/683.15C, 260/683.15 A
[51] Int. Cl..........................................................C07c 3/16
[58] Field of Search .........................260/683.15 C

[56] References Cited

UNITED STATES PATENTS

| | | | |
|---|---|---|---|
| 2,759,033 | 8/1956 | Karchmer et al. | 260/683.15 |
| 2,314,458 | 3/1943 | Stahly et al. | 260/683.15 |

FOREIGN PATENTS OR APPLICATIONS

| | | | |
|---|---|---|---|
| 933,235 | 8/1963 | Great Britain | 260/683.15 |
| 1,246,414 | 11/1960 | France | 260/683.15 |

*Primary Examiner*—Paul M. Coughlin, Jr.
*Attorney*—F. W. Brunner and Gordon C. Mack

[57] ABSTRACT

Propylene is polymerized with an acid catalyst in an aqueous reaction mixture. During substantially the entire polymerization period there is present in the reaction mixture a dimer solvent which is sufficiently immiscible with the reaction mixture to form a second layer in the reaction zone to thus remove from the reaction mixture the dimer which is produced and thus prevent its further polymerization.

4 Claims, No Drawings

DIMERIZATION OF PROPYLENE

This application is a continuation of our application, Ser. No. 668,264 filed July 14, 1967 and now abandoned which is a continuation-in-part of our application, Ser. No. 539,243 filed Feb. 23, 1966 and now abandoned which is a continuation-in-part of our application, Ser. No. 312,560 filed Sept. 30, 1963 and now abandoned.

This invention relates to the selective polymerization of propylene with the production of dimers, and particularly isoprene precursors. Such precursors readily produce isoprene on cracking.

It is well known that phosphoric, sulfuric, hydrochloric, benzene sulfonic, toluene sulfonic acids, etc. and cation exchange resins can be used as catalysts for the polymerization of propylene in aqueous reaction mixtures. According to this invention, polymerizations so catalyzed are made more efficient by carrying them out in the presence of a solvent (referred to herein as the dimer solvent) which is a solvent for the dimers and is sufficiently immiscible with the aqueous reaction phase to form a second layer in the reaction zone and preferably also in the presence of a solvent (referred to herein as the propylene solvent) which solvent is relatively inert to react with propylene and is miscible with the aqueous reaction mixture. The two solvents are immiscible. The dimer solvent which is present throughout substantially the entire reaction dissolves dimer from the aqueous reaction mixture almost as rapidly as it is formed, so that the tendency to form higher polymers is minimized; and the propylene solvent when mixed with the aqueous catalyst renders the propylene more soluble in this phase of the reaction mixture than if the solvent were absent.

The catalysts can be used in any usual concentrations. The phosphoric, sulfuric and sulfonic acid concentrations may exceed 100 per cent. Usually lower concentrations are preferred, such as 15 to 35 per cent when phosphoric acid is used as the catalyst, and below 10 per cent when sulfuric acid is used as the catalyst. Hydrochloric acid is so corrosive that it is not generally employed, although theoretically any concentration may be utilized. Corrosion inhibitors may be employed to protect the equipment. The reaction may be carried out on a batch basis or as a continuous process. The usual acid-resistant apparatus is satisfactory, such as that made of stainless steel, Hastelloy B or the like, particularly if a corrosion prohibitor is present.

Isopropanol is the preferred propylene solvent. Its presence minimizes production of isopropanol during the polymerization, and in this manner the yield of hydrocarbon polymers is increased. Other propylene solvents which may be employed include alcohols, for example ethyl alcohol, propyl alcohols, butyl alcohols, and ethylene glycol; acetone and methyl ethyl ketone, etc. can be used if water is present in sufficient amount to render them immiscible in the dimer solvent that is utilized. This list is illustrative, and is not to be interpreted in a limiting sense.

The dimer solvent will be selected not only because of its solvent properties but also because of its boiling range which is important in the separation of the reaction products therefrom. A dimer solvent with a boiling point as low as about 90° C. will be used but for separation of any trimer formed with the dimer, a solvent boiling above about 150° C. may be used if separation of trimer from the dimer is not necessary. Generally, dimer solvents will not boil above about 350° C. Dimer solvents which may be employed are preferably monomers and more especially are monomer solvents inert to the reaction not produced in the polymerization and include higher alcohols, for example hexyl alcohols, etc.; kerosene, mineral oils, decahydronaphthalene, tetrahydronaphthalene, and other hydrocarbons including aromatic, aliphatic and naphthenic solvents, etc. This list is illustrative and is not be construed in a limiting sense.

The dimer solvent must be present at the start of the reaction in order to immediately remove dimer from the aqueous phase which contains the catalyst and propylene before it has an opportunity to react further and produce higher polymers.

Any two solvents can be used which are immiscible under the conditions present during the polymerization, one of which increases the solubility of propylene in the catalyst, and the other of which dissolves dimer from the reaction mixture. The immiscibility is influenced by such factors as temperature, the amount of water present in the catalyst, etc. The temperatures used for the polymerization are generally in the range of 100° to 350° C., or preferably 250° to 300° C., and the pressure may range from 500 to 5,000 psi, or preferably 2,000 to 3,500 psi. Temperatures, pressures and acid concentrations known to the art can be used.

After the polymerization the reaction mixture is preferably cooled to allow the solvents with their solutes to separate into layers. The propylene solvent containing the aqueous catalyst is withdrawn, usually as the bottom layer, and in a continuous process it is recycled for further use with the addition of propylene, and such additional catalyst as is required, together with propylene solvent to replace any lost during the process. These additions may be made continuously or at intervals.

The other layer, which contains the dimer solvent, is then treated for the recovery of the dimer. Also, if a solvent other than a propylene polymer is used, the higher polymers are separated from the dimer solvent. This is usually done in a still or a series of stills. In a continuous operation, the solvent is recycled. A small amount of solvent is added to compensate for that lost in the process. If the dimer solvent is a higher polymer formed in the reaction, a small amount is bled off continuously or from time to time to maintain a substantially constant volume of the solvent. The distillate may include unreacted propylene and the dimers, and these are readily separated as by subsequent distillation. The dimers may be further refined by distillation to separate a hexene fraction which is high in the isoprene precursors. These precursors include -

2-methyl-2-pentene
3-methyl-trans-2-pentene
3-methyl-cis-2-pentene
2,3-dimethyl-1-butene Other hexenes, including branched hexenes and n-hexene are produced.

The invention is illustrated by the following examples.

EXAMPLES 1, 2 AND 3

Examples 1, 2 and 3 were carried out under substantially the same polymerization conditions except for the solvent or solvents present, and the results therefore are roughly comparable. Aqueous phosphoric acid was used as the catalyst. The propylene solvent was isopropanol, and the dimer solvent was decahydronaphthalene. When the dimer solvent was present at the start of the reaction, the operation was significantly more efficient than when it was not present.

The polymerizations were effected in a 1-liter autoclave of Hastelloy B, although other equipment formed from other acid-resistant alloys may be used. The process is preferably carried out on a continuous basis. Catalyst promoters may be used. The results recorded in the following table refer to batch operations in which both solvents were present at the start of the reaction. The pressure was due primarily to the presence of the propylene at the reaction temperature. The conditions of the reactions together with a comparison of the dimer yields and dimer efficiencies are tabulated below. Each reaction mixture was cooled to about room temperature before separating the immiscible solvents.

EXAMPLES

|  | 1 | 2 | 3 |
|---|---|---|---|
| Time, minutes | 67 | 60 | 15 |
| Pressure, psi. | 3600 | 4590 | 4320 |
| Temperature, °C. | 290–300 | 290–304 | 296–301 |
| Propylene, grams | 200 | 200 | 200 |
| Catalyst concentration, grams | 62.5[a] | 62.5[b] | 50[c] |
| Isopropanol, grams | 0 | 93.7 | 75[c] |

| Decahydronaphthalene, grams | 0 | 0 | 50 |
| --- | --- | --- | --- |
| Dimer yield, weight % | 21.2 | 28.8 | 16.2 |
| Efficiency to dimer, % | 53.1 | 53.7 | 75.7 |

(a) 250 grams aqueous $H_3PO_4$ (25%)
(b) 250 grams aqueous solution of which 25% is $H_3PO_4$ and 37.5% is isopropanol.
(c) 200 grams aqueous solution of which 25% is $H_3PO_4$ and 37.5% is isopropanol.

It is noted that in Example 3, in which decahydronaphthalene was present at the start of the reaction as dimer solvent, the efficiency of the reaction was increased by substantially 50 percent.

Although the process is most advantageously carried out in the presence of both immiscible solvents, the dimer solvent may advantageously be used alone when present throughout the reaction, without propylene solvent being present.

Two or more solvents and two or more dimer solvents may be used.

The invention is disclosed in the claims which follow.

We claim:

1. In the process of polymerizing propylene with 15 to 35 percent phosphoric acid in an aqueous reaction mixture, with production of a substantial percentage of dimers which are isoprene precursors, the improvement which comprises (1) effecting substantially the entire polymerization while the reaction mixture contains (a) a dimer solvent which (A) has a boiling point between substantially 90° and 350° C. and (B) is sufficiently immiscible with the reaction mixture to form a first layer in the reaction zone and (b) a propylene solvent which (A) is miscible with the aqueous reaction mixture, (B) is sufficiently immiscible with the dimer solvent to form a second layer in the reaction zone, and (C) in which the propylene is more soluble than in water, the dimer solvent and at least some of the propylene solvent being supplied to the system, (2) separating the immiscible solvents and (3) recovering propylene dimer from the dimer solvent.

2. The process of claim 1 in which the dimer solvent is decahydronaphthalene.

3. The process of claim 1 in which the propylene solvent is isopropanol.

4. The process of claim 1 in which the dimer solvent has a boiling point between 150° and 350° C.

* * * * *